Jan. 5, 1960     A. A. S. ROSE     2,919,938
FLUID SEAL

Filed Oct. 9, 1958     3 Sheets-Sheet 1

INVENTOR
A.A.S. ROSE
BY
Maybee & Legris
ATTORNEYS

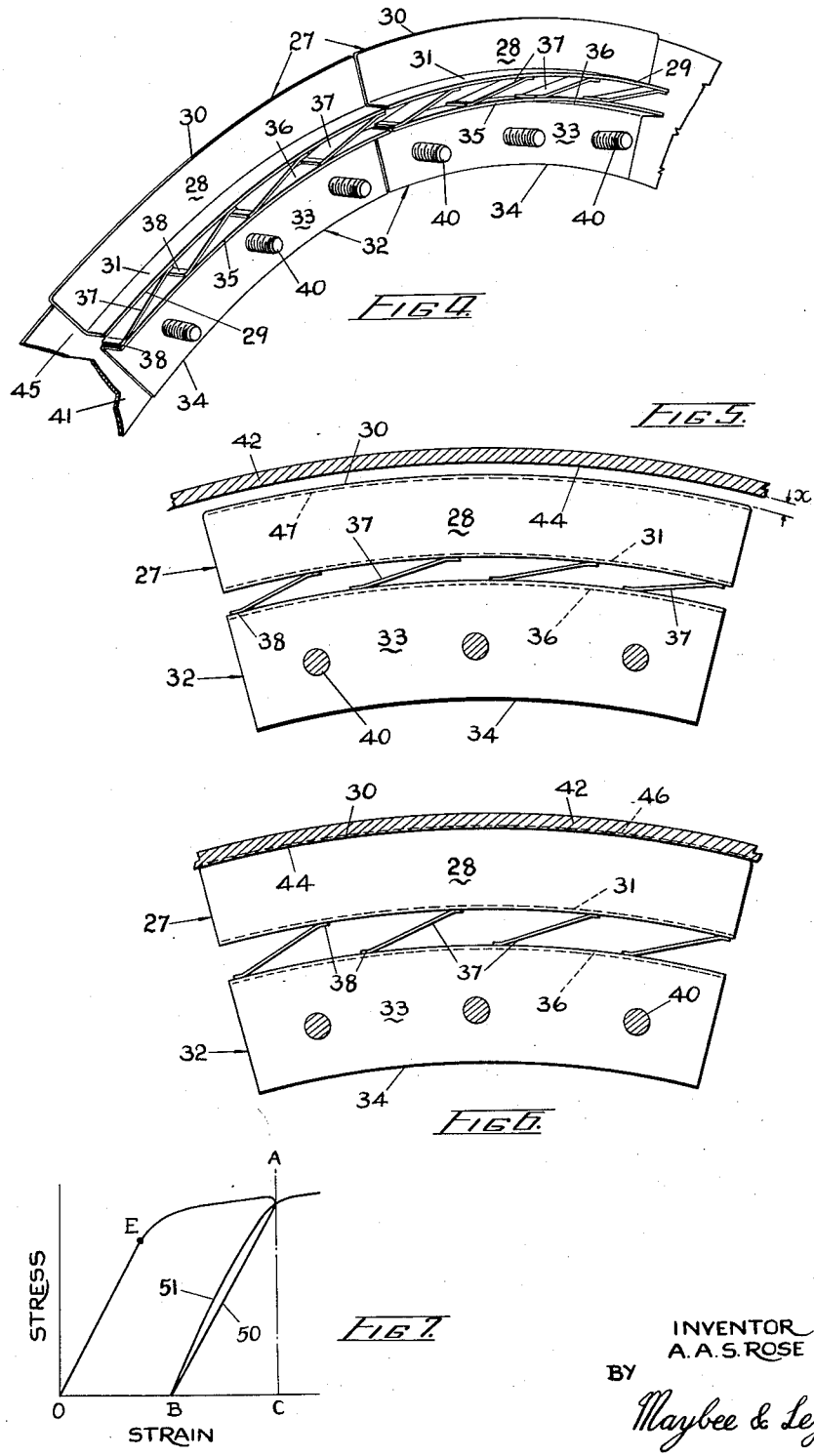

United States Patent Office

2,919,938
Patented Jan. 5, 1960

2,919,938

FLUID SEAL

Arnold Aaron Saul Rose, Islington, Ontario, Canada, assignor to Avro Aircraft Limited, Ontario, Canada, a corporation Application October 9, 1958, Serial No. 766,223

10 Claims. (Cl. 286—11.11)

This invention relates to seals for controlling, and in certain cases preventing, the passage of fluid through a clearance gap between a first hollow member and a second rotary member within the first member and rotatable relatively thereto. The invention has particular application to a seal for reducing, or preventing, leakage of the working fluid from a compressor or a turbine of a gas turbine engine.

Labyrinth-type seals have been used to control the leakage between relatively rotating parts in gas turbine engines. With the increasing size of engines it is necessary to provide a seal around a relatively large diameter annulus and in the manufacture of such larger engines the allowed tolerances are larger than in small engines and may be increased still further to facilitate engine assembly.

To use a conventional labyrinth-type seal on large diameters necessitates costly machining procedures to ensure accurate mating of the parts and in use it is difficult to maintain the close running clearances which are necessary to provide an adequate seal.

Moreover, a rigid, labyrinth-type seal is not adapted to seal a variable clearance gap since the running clearances which would have to be provided to prevent fouling of the elements of the seal under all operating conditions between the maximum and minimum values of the clearance would, in a large diameter seal, exceed the clearances required to provide an effective seal.

Conditions in an engine giving rise to gaps of variable clearance may be induced by temperature fluctuations within the engine or by the changing loads imposed on the engine during aircraft manoeuvres.

It is an object of the present invention to provide a seal, between a first hollow member and a second rotary member, which will give adequate clearance for assembly purposes but which will, at a predetermined speed, substantially completely seal off the clearance gap between the members.

A further object of the invention is to provide a seal which allows relatively large clearances for assembly purposes but which, upon initial running of the machine in which the seal is installed, will be automatically adjusted to the working clearance in the machine.

Another object of the invention is to provide a simple, lightweight flexible, heat-resistant seal which is economical to manufacture in different sizes.

A yet further object of the invention is to provide a seal which is maintained in its sealing position by the interaction of centrifugal forces acting on the seal and elastic means and is therefore unaffected by temperature changes or changing loads due to aircraft manoeuvres.

These objects are achieved in a fluid seal between a first hollow member and a second rotary member within the first member and rotatable relatively thereto, when the seal includes an annular, first abutment on the first member, a second abutment adjacent to the periphery of the second member, a plurality of curved plates having faces extending radially between inner and outer peripheral edges and being arranged end-to-end in a substantially annular configuration with a face of each plate adjacent to the second abutment, and elastic means mounting the plates individually on the second member adjacent to the periphery thereof for centrifugal and centripetal movement relatively thereto between first and second positions, there being a substantial clearance between the outer peripheral edges of the plates and the first abutment when the plates are in the first position whereas in the second position the plates extend between the first and second abutments substantially in sealing relationship therewith, the mass of each plate and the strength of its associated elastic means causing the plate to assume its second position at a predetermined speed of rotation of the second member.

The invention will now be described by way of example with reference to the accompanying drawings, in which like reference numerals refer to similar parts throughout the several views, and in which:

Figure 4 is a perspective view of a sealing element forming part of the seal of the invention;

Figures 5 and 6 show the initial and working positions of the seal shown in the previous figures;

Figure 7 is a stress/strain diagram for the springs used in the sealing element;

Figure 1:
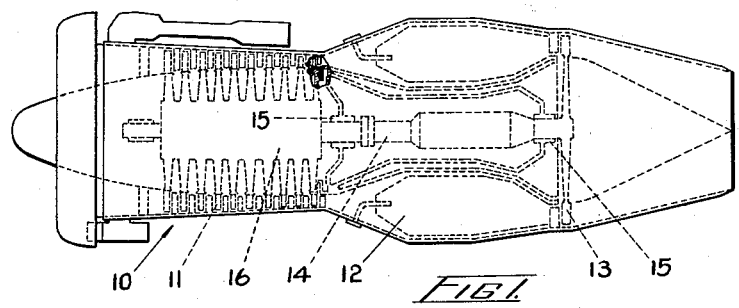
Figure 1 is a longitudinal, partly sectional view of an axial flow gas turbine engine in which the invention is embodied, the location of the invention in the engine being indicated by the portion shown in section.
Figure 2:
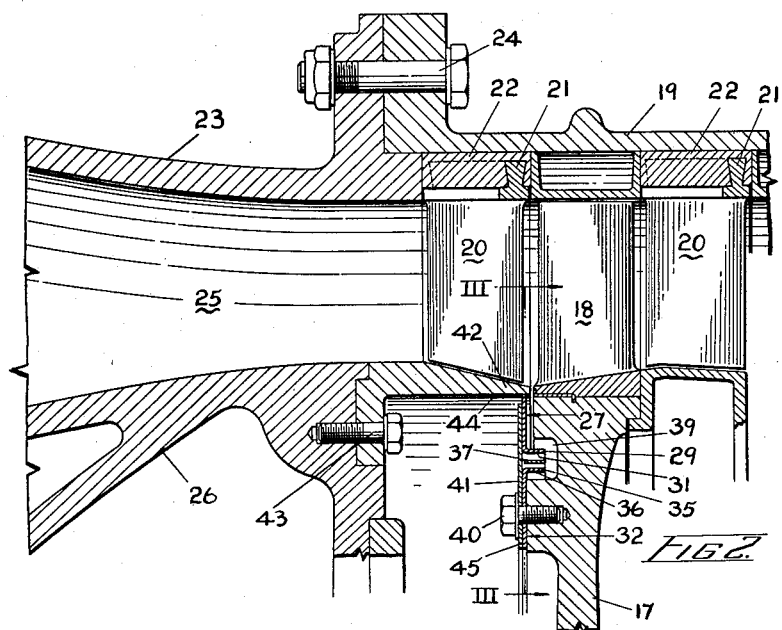
Figure 2 is a part section, on a larger scale, of the portion of the engine shown sectioned in Figure 1 showing a seal embodying the invention mounted on the last stage of the compressor rotor of the engine of Figure 1.
Figure 3:
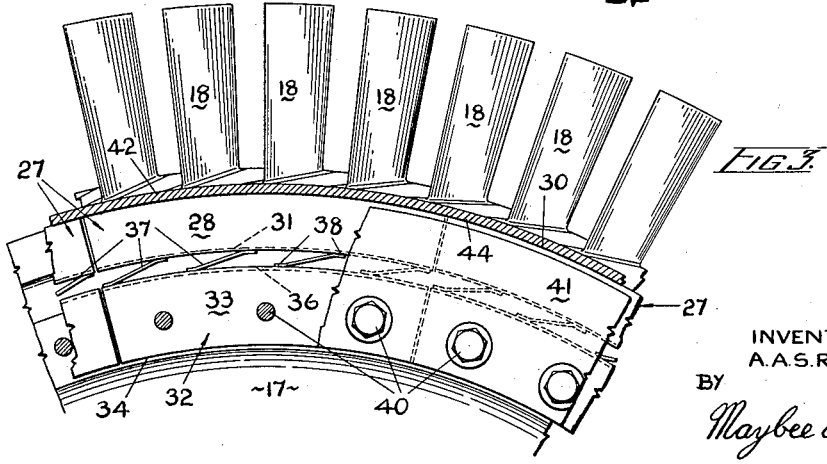
Figure 3 is a transverse section on the line III—III of Figure 2, with parts of the structure being broken away for clarity.

Referring now to Figures 1, 2, and 3, the engine 10 comprises a compressor 11, a combustion system 12 and turbine 13. The compressor and turbine are interconnected by a shaft 14 supported in bearings 15. The compressor rotor, indicated generally at 16, consists of a plurality of disks such as 17, see Figure 2, and each disk 17 carries a row of blades 18. The compressor rotor is surrounded by a compressor stator member 19 in which is mounted rows of blades, some of which are indicated at 20. Each blade 20 has a "dovetailed" root, indicated at 21, which is received in a mounting ring 22 secured to the stator member in known manner. The compressor stator member 19 is secured to the central casing of the engine 23 by bolt assemblies 24. Air is delivered from the compressor from right to left in Figure 2 and passes into a plurality of circumferentially arranged ducts, one of which is shown at 25. The inner "spine" of the engine is indicated at 26.

Turning now to the description of the seal itself, and referring to Figures 2, 3 and 4, the seal comprises a first plurality of thin curved plates indicated at 27 arranged end-to-end in substantially annular configuration. The plates have faces 28 extending radially between inner peripheral edges 29 and outer peripheral edges 30 and the inner peripheral edges 29 are formed on flanges 31 which extend perpendicular to the faces 28. A second plurality of plates, indicated at 32, is arranged within the first plurality, also in end-to-end relation and in an annular configuration. Each plate 32 has faces 33 which extend radially between an inner peripheral edge 34 and an outer peripheral edge 35. Each outer peripheral edge 35 is formed on a flange 36 perpendicular to the faces 33.

The plates of the first and second pluralities are arranged in juxtaposed relation so that the flanges 31 of the plates of the first plurality overlie, and are spaced from, the flanges 36 of the plates of the second plurality. Interposed between the juxtaposed flanges are a plurality of leaf springs 37, the ends of the springs being bent at 38 and being welded to the flanges.

The sealing element consisting of the interconnected plates of the first and second pluralities is mounted, as shown in Figures 2 and 3, upon the downstream side of the disk 17 of the last stage of the compressor rotor. The downstream face of the disk 17 is cut away to provide a groove 39 in which the flanges 36 and 31 are received. The plates 32 of the second plurality are secured to the disk 17 by bolt and washer assemblies 40. The plates of both pluralities are interposed between the disk 17 and an annulus 41 through apertures in which the bolts 40 pass.

Mounted on the spine 26 of the engine is a sealing ring 42 secured to the spine by bolt and washer assemblies 43. The ring 42 provides an annular first abutment and has an annular first abutment surface 44. The annulus 41 provides a second abutment adjacent to the periphery of the compressor rotor 16 and has a second abutment surface 45 with which one face of each plate 27 is held in contact by fluid pressure since the pressure on the right-hand side of each plate 27, as seen in Figure 2, is higher than the pressure on the left-hand side of the plate.

Plates 27 and 32 are sector-shaped and are secured in place with a slight gap between their ends as shown in Figures 3 and 4 so that together they make up an annulus. The plates are conveniently made of thin gauge heat-resistant sheet metal, for example stainless steel. The first abutment surface 44 on the sealing ring 42 is preferably chromium plated or otherwise provided with a hardened surface.

Briefly, the operation of the seal is as follows: the outer peripheral edges 30 of the plates 27 of the first plurality are, when the engine is assembled, clear of the abutment surface 44 on the sealing ring 42. During rotation of the compressor rotor, the plates 27 experience a centrifugal acceleration and will move outwardly, thus deflecting the springs 37. The arrangement is designed so that, at the maximum speed of the engine, the peripheral edges 30 will be in sealing relationship with the first abutment surface 44.

Two situations may arise within this general arrangement. The first situation is when the original clearance between the peripheral edges 30 and the first abutment surface 44 is such that the peripheral edges 30 may come into contact with the edge 44 without stretching the springs 37 beyond their elastic limit. The second situation is when the initial clearance encountered on assembly is so large that in, moving outwardly into contact with the first abutment surface 44, the plates 27 stretch the springs 37 beyond their elastic limit.

The first situation will now be considered with reference to Figures 5 and 6. In Figure 5, the components of the seal are shown in the positions they occupy immediately after assembly and before the engine has been run. In this position there is a clearance $x$ between the outer peripheral edge 30 of the plate 27 and the first abutment surface 44 of the sealing ring 42. If now the engine is started, the plates 27 will move outwardly and the strength of the springs is so calculated that, at the predetermined maximum speed, if the plates 27 were not constrained by the sealing ring 42, they would move to a slightly more outward position than they can in fact do. The position of the outer edges 30 in this hypothetical position is shown by the dotted line 46 in Figure 6. As a result, when the engine is first allowed to run at its maximum speed the outer peripheral edges 30 come into contact with the first abutment surface 44 and are worn away. The mass of the sealing ring 42 is large compared with the mass of the plates 27 and as a result the heat generated by the engagement of the edges 30 with the surface 44 is dissipated far more quickly in the ring 42 than in the plates. The heat generated will grind the edges 30 away until the centrifugal force tending to move the plates outwardly will just balance the moments of the springs 37 and in this position the edges 30 will be just clear of the first abutment surface 44. The amount of the plates 27 which will be worn off is indicated by the distance betwen the dash-line 47 and the peripheral edge 30 in Figure 5.

When the engine is stopped, the plates will return to the positions shown in Figure 5 except that the outer peripheral edges of the plates 27 will now lie along the line 47. When the engine is again started, the plates 27 will move outwardly and since their outer peripheral edges have already been worn away so that, at the maximum speed, the centrifugal force is in equilibrium with the moments of the springs, the outer peripheral edges are in sealing relationship with the first abutment surface 44, that is to say the edges are just clear of the edge 44 so that the clearance gap will be sealed.

It will be appreciated that the plates 27 will only assume the optimum sealing position at a certain predetermined speed of rotation of the compressor rotor 16 which speed is normally the maximum speed of rotation of the engine. At speeds lower than the predetermined speed there will be some leakage through the clearance gap due to the fact that the centrifugal force on the plates 27, which is a function of the square of the angular velocity of the rotor, will decrease so that the plates will not assume their most outward position. However, for the purposes for which the seal is intended this leakage at low speeds is acceptable.

Figure 8:
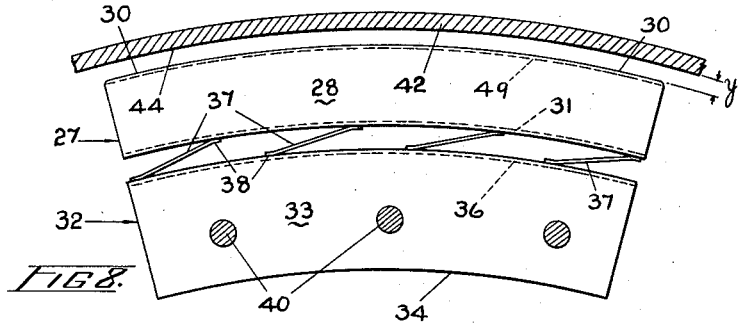
Figures 8, 9 and 10 show various states of a modified seal.
Figure 9:
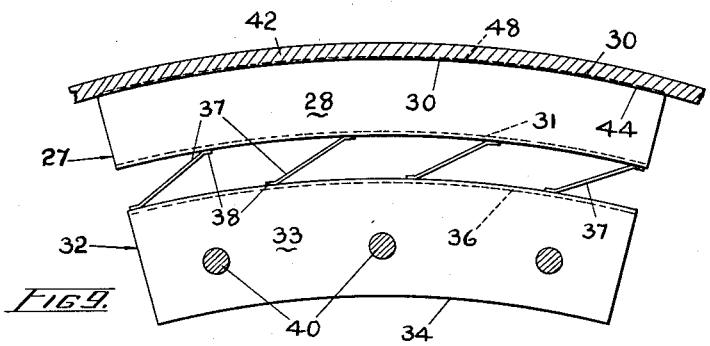
Figure 10:
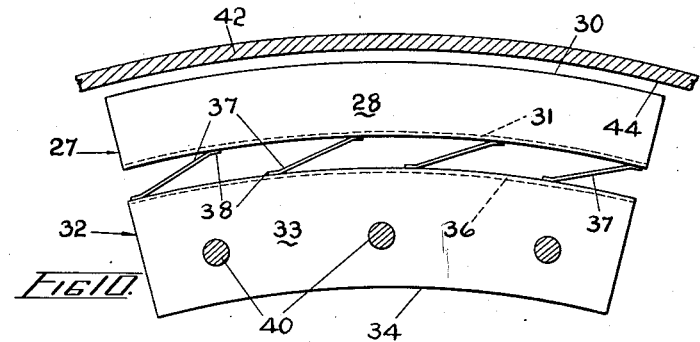

The second situation is illustrated in Figures 8, 9 and 10. In Figure 8 the seal is shown in its position after assembly but before the engine has run, the initial clearance is indicated at $y$ and is greater than that which can be accommodated by elastic deformation of the springs 37. When the engine is initially run, the plates 27 will move outwardly as in the previous example and the outer peripheral edges of the plates will be ground away also in a manner similar to that described with reference to the previous example. Thus the position which the outer edges of the plates would assume at the predetermined speed if unconstrained by the ring 42 is indicated at 48 in Figure 9. The plates will be ground away to the line 49 in Figure 8 until the centrifugal force is in equilibrium with the moment of the springs 37. The outer peripheral edge 30 of the plates will then be just clear of the first abutment surface 44 of the ring 42 and will be in sealing relationship therewith, this position is shown in Figure 9. During the movement of the plates 27 to the position shown in Figure 9, the springs 37 have been deflected beyond their elastic limit and, as a result, some permanent set has occurred. Thus when the engine is stopped the plates 27 will return to the position shown in Figure 10 and not to the initial position after assembly shown in Figure 8. It will be seen that the position of the plates 27 in Figure 10 is further outwardly than the position shown in Figure 8 and this difference is accounted for by the permanent set of the springs 37. Thereafter, if the engine is started up, the plates 27 will move outwardly and the operation of the device will then be similar to the first embodiment described since the further outward and inward movement will be within the elastic limit of the springs, the elastic limit having been increased due to the permanent set.

In this connection reference is had to Figure 7 which is a stress/strain diagram for the springs. During the initial run, the springs will be stressed, by the centrifugal moments of the plates 27, to the point A on the stress/strain curve. The deformation up to the point E will be elastic and thereafter will be plastic and will induce permanent set. When the engine is stopped, the springs will be unstressed along the line 50 from A to B and the elastic deformation will be removed leaving only the plastic deformation as permanent set. Thus the distance OB on Figure 7 is the residual plastic strain when the seal is in the position of Figure 10, the distance BC representing the elastic strain removed on stopping the engine. When the engine is again started the springs will be stressed along the line 51 from B to A and when the engine is stopped the springs will be unstressed along the line 50 from A to B. Thus subsequent operation will be within the elastic limit of the springs which, as a result of the permanent set, has moved from E to A. It follows that the subsequent operation of the seal will be similar to that of the embodiment previously described.

Figure 11:
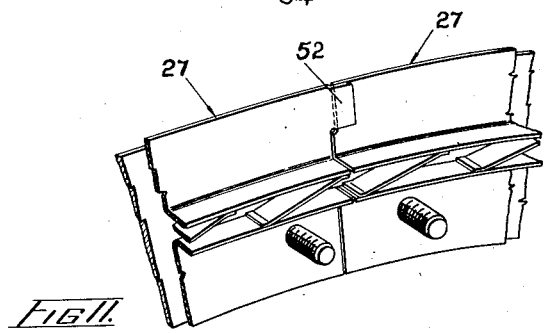
Figure 11 is a detail perspective view, similar to Figure 4, but of a modified form of seal.

A modified form of the sealing element is shown in Figure 11 in which the plates 27 of the first plurality are provided at one edge with an overlapping portion 52 which seals the radial gaps between the plates as they move outwardly into sealing position. In many applications of the seal, the radical gaps between the plates can be ignored but in some applications it is desirable to close the gaps. If desired the radial edges of adjacent plates could be tongued and grooved.

It will be seen that the invention provides a simple seal which is applicable to a variety of rotating machines including, for example, radial flow compressors and turbines and machines having contra-rotating members. In the latter case the plates are mounted on one member and the sealing ring on the other.

The seal according to the invention is unaffected by factors other than the rotational speed of the member to which it is attached and is therefore very reliable.

It will be understood that the form of the invention herewith shown and described is a preferred example and various modifications can be carried out without departing from the spirit of the invention or the scope of the appended claims.

What I claim as my invention is:

1. A fluid seal between a first hollow member and a second rotary member within the first member and rotatable relatively thereto, the seal including an annular, first abutment on the first member, a second abutment adjacent to the periphery of the second member, a plurality of curved plates having faces extending radially between inner and outer peripheral edges and being arranged end-to-end in a substantially annular configuration with a face of each plate adjacent to the second abutment, and elastic means mounting the plates individually on the second member adjacent to the periphery thereof for centrifugal and centripetal movement relatively thereto between first and second positions, there being a substantial clearance between the outer peripheral edges of the plates and the first abutment when the plates are in the first position whereas in the second position the plates extend between the first and second abutments substantially in sealing relationship therewith, the mass of each plate and the strength of its associated elastic means causing the plate to assume its second position at a predetermined speed of rotation of the second member.

2. A fluid seal between a first hollow member and a second rotary member within the first member and rotatable relatively thereto, the seal including an annular, first abutment surface on the first member, a second abutment surface adjacent to the periphery of the second member, a plurality of curved plates having faces extending radially between inner and outer peripheral edges and being arranged end-to-end in a substantially annular configuration with a face of each plate closely adjacent and parallel to the second abutment surface and with the outer peripheral edge of each plate parallel to the first abutment surface, and elastic means mounting the plates individually on the second member adjacent to the periphery thereof for centrifugal and centripetal movement relatively thereto between first and second positions, there being a substantial clearance between the outer peripheral edges of the plates and the first abutment surface when the plates are in the first position whereas in the second position the plates extend between the first and second abutment surfaces substantially in sealing relationship therewith, the outer peripheral edge of each plate being in sealing relationship with the first abutment plate being in sealing relationship with the first abutment surface whereas said face of each plate is in sealing relationship with the second abutment surface, the mass of each plate and the strength of its associated elastic means causing the plate to assume its second position at a predetermined speed of rotation of the second member.

3. A fluid seal between a first hollow member and a second rotary member within the first member and rotatable relatively thereto, the seal including an annular, first abutment on the first member, a second abutment adjacent to the periphery of the second member, a plurality of thin, curved plates having faces extending radially between inner and outer peripheral edges and being arranged end-to-end in substantially annular configuration with a face of each plate adjacent to the second abutment, elastic means mounting the plates individually on the second member adjacent to the periphery thereof for centrifugal and centripetal movement relatively thereto between first and second positions, there being a substantial clearance between the outer peripheral edges of the plates and the first abutment when the plates are in the first position whereas in the second position the plates extend between the first and second abutments substantially in sealing relationship therewith, the first abutment being relatively massive compared with the plates to quickly dissipate heat generated by contact between the plates and the abutments to wear away the outer peripheries of the plates, the mass of each plate and the strength of its associated elastic means causing the plate to assume its second position at a predetermined speed of rotation of the second member.

4. A fluid seal between a first hollow member and a second rotary member within the first member and rotatable relatively thereto, the seal including an annular, first abutment on the first member, a second abutment adjacent to the periphery of the second member, a first plurality of thin, curved plates having faces extending radially between inner and outer peripheral edges and being arranged end-to-end in substantially annular configuration with a face of each plate adjacent to the second abutment, a second plurality of thin plates arranged end-to-end in annular configuration within the configuration of the plates of the first plurality and secured to the second member adjacent the periphery thereof, the plates of the second plurality also extending radially between inner and outer peripheral edges, a flange at the inner edge of each plate of the first plurality, a flange at the outer edge of each plate of the second plurality, and elastic means interposed between the flanges of the plates of the first plurality and the flanges of the plates of the second plurality for mounting the plates of the first plurality adjacent to the periphery of the second member for centrifugal and centripetal movement relatively thereto between first and second positions, there being a substantial clearance between the outer peripheral edges of the plates of the first plurality and the first abutment when said plates are in the first position whereas in the second position the plates of the first plurality extend between the first and second abutments substantially in sealing relationship therewith, the mass of each plate of the first plurality and the strength of its associated elastic means causing said plate to assume its second position at a predetermined speed of rotation of the second member.

5. A fluid seal between a first hollow member and a second rotary member within the first member and rotatable relatively thereto, the seal including an annular, first abutment on the first member, a second abutment adjacent to the periphery of the second member, a first plurality of thin, curved plates having faces extending radially between inner and outer peripheral edges and being arranged end-to-end in substantially annular configuration with a face of each plate adjacent to the second abutment, a second plurality of thin plates arranged end-to-end in annular configuration within the configuration of the plates of the first plurality and secured to the second member adjacent the periphery thereof, the plates of the second plurality also extending radially between inner and outer peripheral edges, a flange at the inner edge of each plate of the first plurality, a flange at the outer edge of each plate of the second plurality, and leaf springs interposed between the flanges of the plates of the first plurality and the flanges of the plates of the second plurality for mounting the plates of the first plurality adjacent to the periphery of the second member for centrifugal and centripetal movement relatively thereto between first and second positions, there being a substantial clearance between the outer peripheral edges of the plates of the first plurality and the first abutment when said plates are in the first position whereas in the second position the plates of the first plurality extend between the first and second abutments substantially in sealing relationship therewith, the mass of each plate of the first plurality and the strength of its associated leaf springs causing said plate to assume its second position at a predetermined speed of rotation of the second member.

6. A fluid seal between a first hollow member and a second rotary member within the first member and rotatable relatively thereto, the seal including an annular, first abutment on the first member, a second abutment adjacent to the periphery of the second member, a first plurality of thin, curved plates having faces extending radially between inner and outer peripheral edges and being arranged end-to-end in substantially annular configuration, a second plurality of thin plates arranged end-to-end in annular configuration within the configuration of the plates of the first plurality and secured to the second member adjacent the periphery thereof, the plates of the second plurality also having faces extending radially between inner and outer peripheral edges, the second abutment comprising an annulus secured to the second member so that all said plates are interposed between the annulus and the second member and so that the faces of the plates are in contact with the annulus, a flange at the inner edge of each plate of the first plurality, a flange at the outer edge of each plate of the second plurality, and elastic means interposed between the flanges on the plates of the first plurality and the flanges of the plates of the second plurality for mounting the plates of the first plurality adjacent to the periphery of the second member for centrifugal and centripetal movement relatively thereto between first and second positions, there being a substantial clearance between the outer peripheral edges of the plates of the first plurality and the first abutment when said plates are in the first position whereas in the second position the plates of the first plurality extend between the first and second abutments in substantial sealing relationship therewith, the mass of each plate of the first plurality and the strength of its associated elastic means causing said plate to assume its second position at a predetermined speed of rotation of the second member.

7. A fluid seal between a first hollow member and a second rotary member within the first member and rotatable relatively thereto, the seal including an annular, first abutment on the first member, a second abutment adjacent to the periphery of the second member, a first plurality of thin, curved plates having faces extending radially between inner and outer peripheral edges and being arranged end-to-end in substantially annular configuration, a second plurality of thin plates arranged end-to-end in annular configuration within the configuration of the plates of the first plurality and secured to the second member adjacent the periphery thereof, the plates of the second plurality also having faces extending radially between inner and outer peripheral edges, the second abutment comprising an annulus secured to the second member so that all said plates are interposed between the annulus and the second member and so that the faces of the plates are in contact with the annulus, a flange at the inner edge of each plate of the first plurality, a flange at the outer edge of each plate of the second plurality, and leaf springs interposed between the flanges on the plates of the first plurality and the flanges of the plates of the second plurality for mounting the plates of the first plurality adjacent to the periphery of the second member for centrifugal and centripetal movement relatively thereto between first and second positions, there being a substantial clearance between the outer peripheral edges of the plates of the first plurality and the first abutment when said plates are in the first position whereas in the second position the plates of the first plurality extend between the first and second abutments in substantial sealing relationship therewith, the mass of each plate of the first plurality and the strength of its associated leaf springs causing said plate to assume its second position at a predetermined speed of rotation of the second member.

8. An air seal in a compressor having a hollow stator and a rotor within the stator and rotatable relatively thereto, the seal including an annular, first abutment on the stator, a second abutment adjacent to the periphery of the rotor, a plurality of curved plates having faces extending radially between inner and outer peripheral edges and being arranged end-to-end in substantially annular configuration with a face of each plate adjacent to the second abutment, and elastic means mounting the plates individually on the rotor adjacent to the periphery thereof for centrifugal and centripetal movement relatively thereto between first and second positions, there being a substantial clearance between the outer peripheral edges of the plates and the first abutment when the plates are in the first position whereas in the second position the plates extend between the first and second abutments substantially in sealing relationship therewith, the mass of each plate and the strength of its associated elastic means causing the plate to assume its second position at a predetermined speed of rotation of the rotor.

9. An air seal in an axial flow compressor having a hollow stator and a rotor within the stator and rotatable relatively thereto, the seal including an annular, first abutment on the stator, a second abutment adjacent to the periphery of the rotor at the delivery end thereof, a plurality of curved plates having faces extending radially between inner and outer peripheral edges and being arranged end-to-end in substantially annular configuration with a face of each plate adjacent to the second abutment, and elastic means mounting the plates individually on the rotor adjacent to the periphery thereof for centrifugal and centripetal movement relatively thereto between first and second positions, there being a substantial clearance between the outer peripheral edges of the plates and the first abutment when the plates are in the first position whereas in the second position the plates extend between the first and second abutments substantially in sealing relationship therewith, the mass of each plate and the strength of its associated elastic means causing the plate to assume its second position at a predetermined speed of rotation of the rotor.

10. An air seal in an axial flow compressor having a hollow stator and a rotor within the stator and rotatable relatively thereto, the seal including an annular, first abutment on the stator, a second abutment adjacent to the periphery of the rotor at the delivery end thereof, a first plurality of thin, curved plates having faces extending radially between inner and outer peripheral edges and being arranged end-to-end in substantially annular configuration, a second plurality of thin plates arranged end-to-end in annular configuration within the configuration of the plates of the first plurality and secured to the rotor adjacent the periphery thereof, the plates of the second plurality also having faces extending radially between inner and outer peripheral edges, a flange at the inner edge of each plate of the first plurality, the second abutment comprising an annulus secured to the rotor so that all said plates are interposed between the annulus and the rotor and so that faces of the plates are in contact with the annulus, a flange on the outer edge of each plate of the second plurality, and leaf springs interposed between the flanges on the plates of the first plurality and the flanges of the plates of the second plurality for mounting the plates of the first plurality adjacent to the periphery of the rotor for centrifugal and centripetal movement relatively thereto between first and second positions, there being a substantial clearance between the outer peripheral edges of the plates of the first plurality and the first abutment when said plates are in the first position whereas in the second position the plates of the first plurality extend between the first and second abutments in substantial sealing relationship therewith, the mass of each plate of the first plurality and the strength of its associated leaf springs causing said plate to assume its second position at a predetermined speed of rotation of the rotor.

References Cited in the file of this patent

UNITED STATES PATENTS

| | | |
|---|---|---|
| 2,570,427 | Chillson et al. | Oct. 9, 1951 |
| 2,634,090 | Hardigg | Apr. 7, 1953 |